Jan. 29, 1929.
C. DE FELICE
1,700,584
APPARATUS FOR AND PROCESS OF MAKING STEMMED ARTIFICIAL FRUIT BODIES
Filed June 20, 1921  4 Sheets-Sheet 4
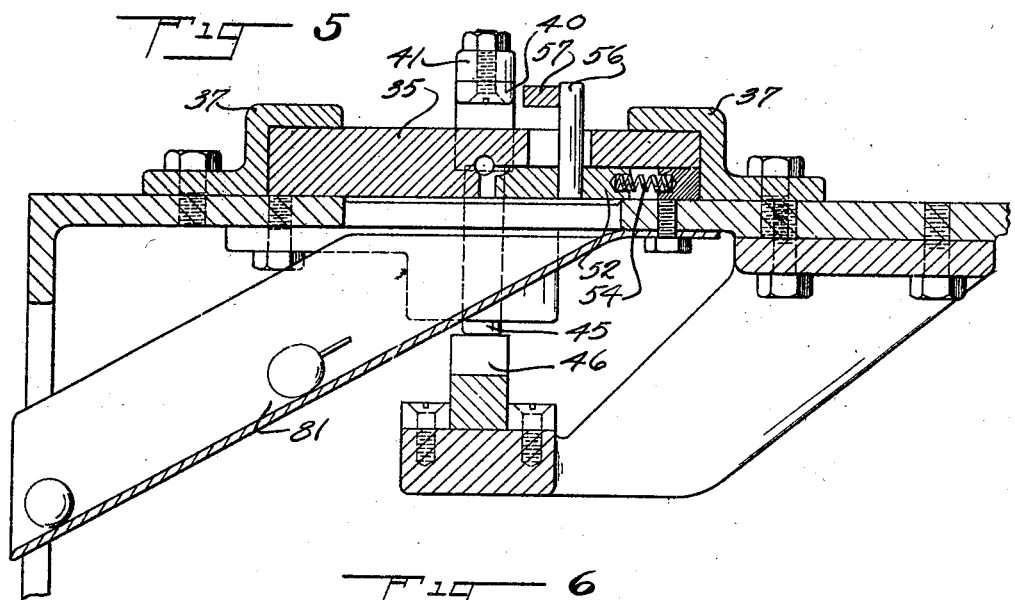
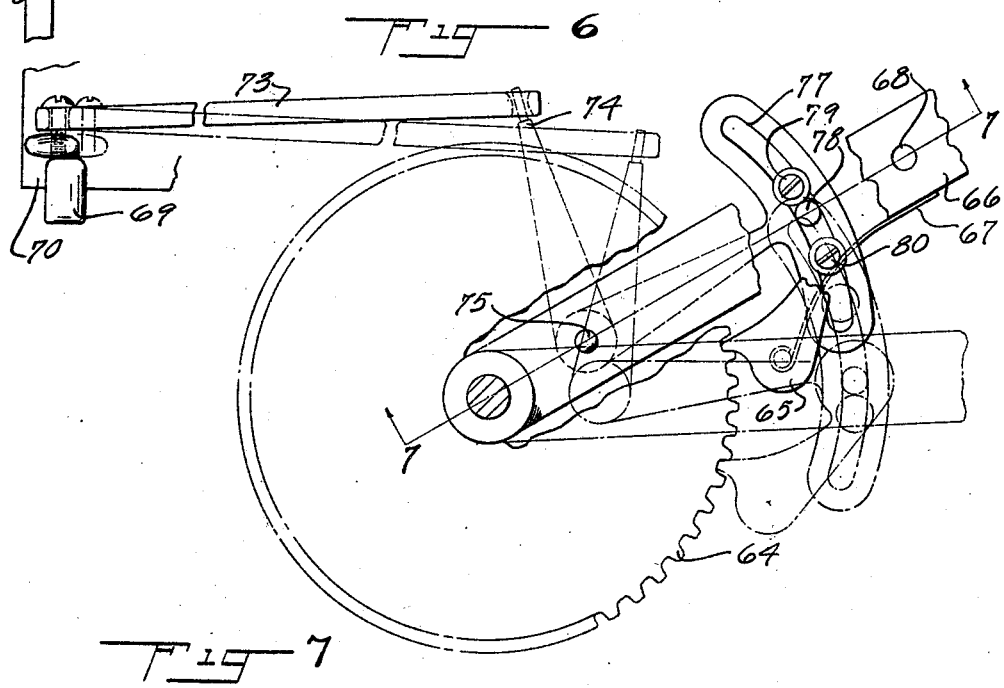
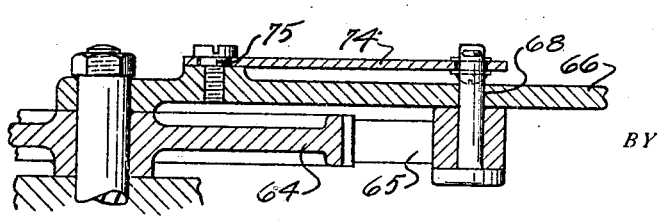
INVENTOR
Carlo De Felice
BY
H. H. Dyke
ATTORNEY Patented Jan. 29, 1929.

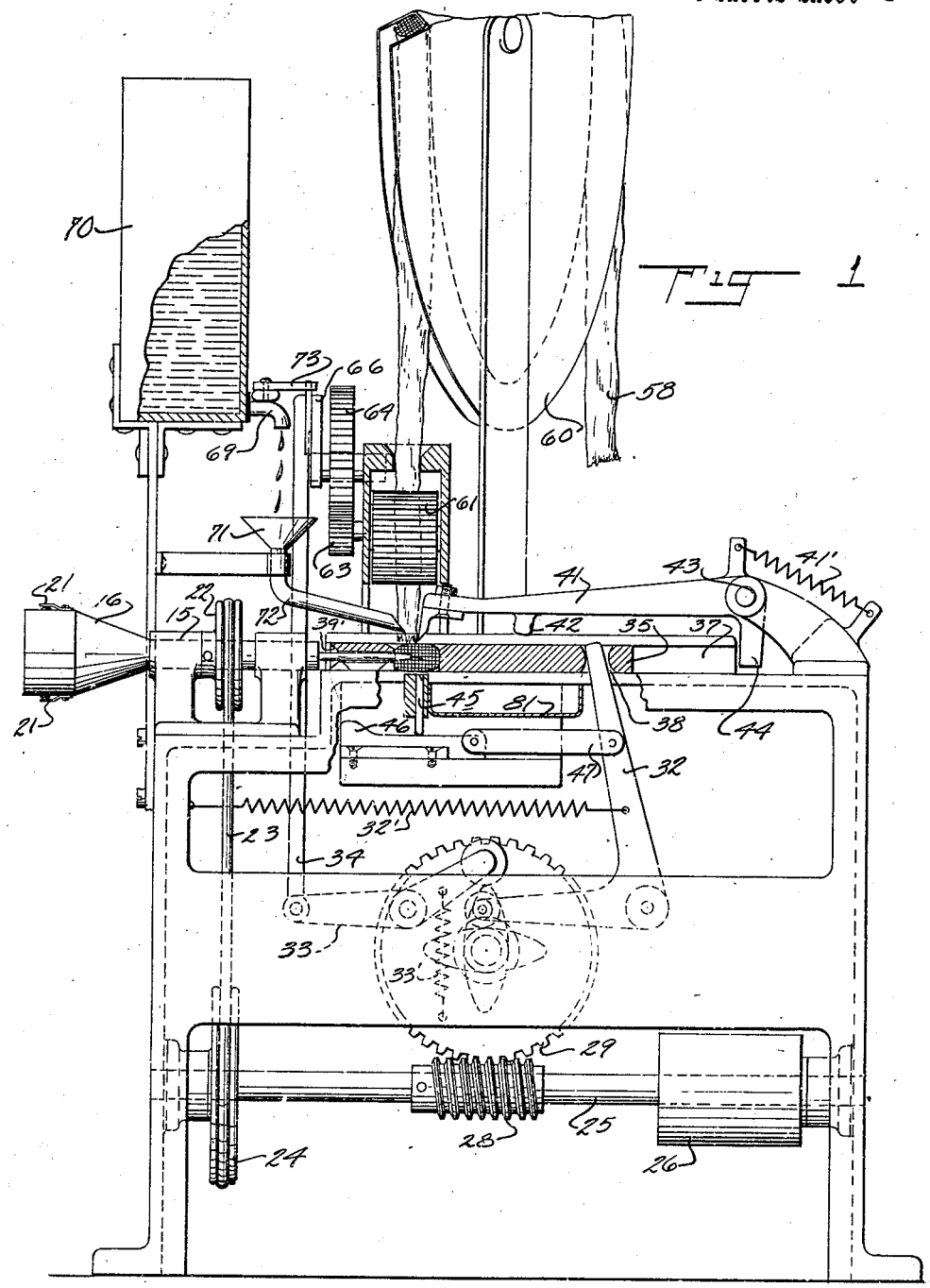

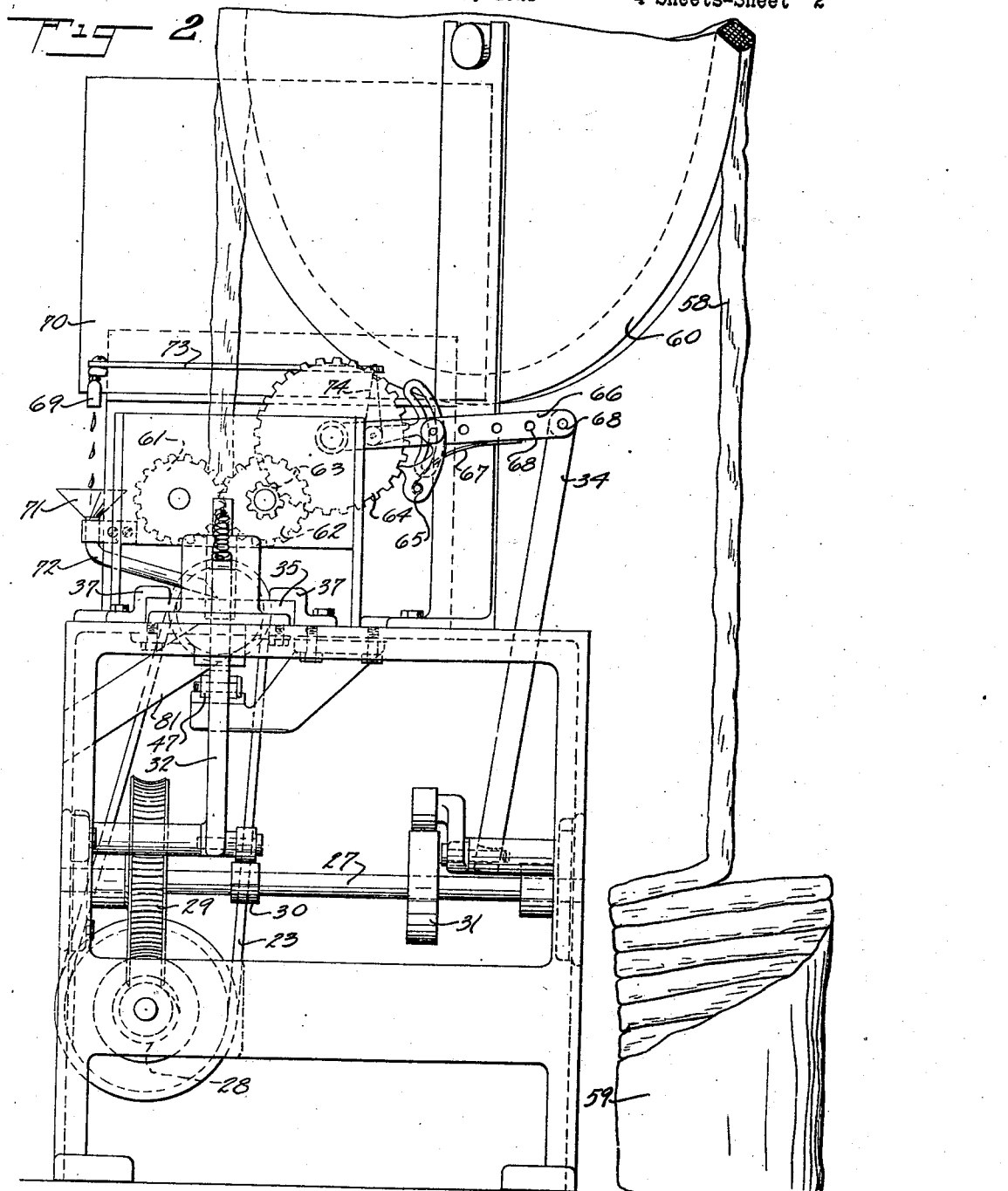

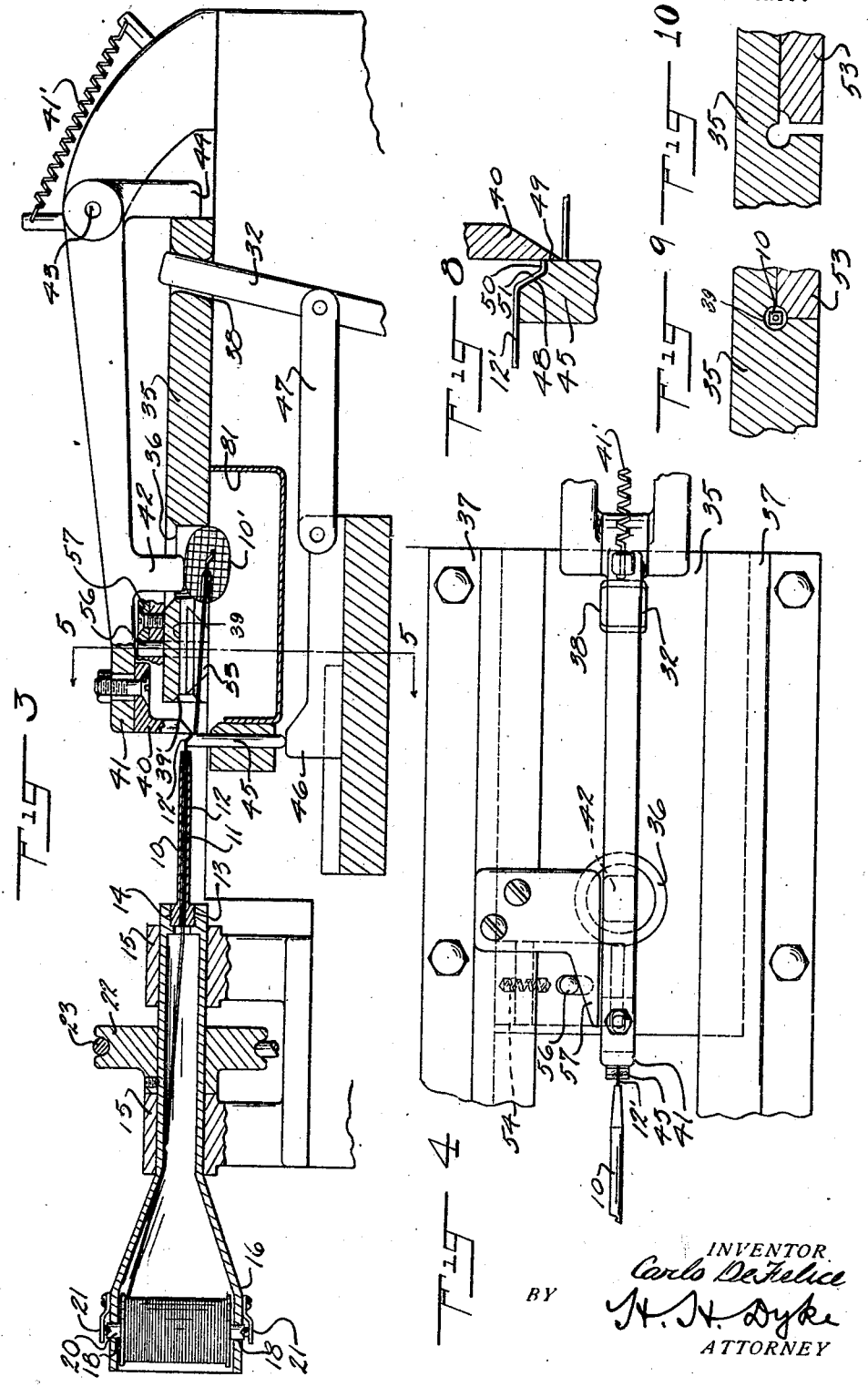

1,700,584

UNITED STATES PATENT OFFICE.

CARLO DE FELICE, OF NEW YORK, N. Y., ASSIGNOR TO H. N. McMENIMEN, OF SCOTCH PLAINS, NEW JERSEY.

APPARATUS FOR AND PROCESS OF MAKING STEMMED ARTIFICIAL FRUIT BODIES.

Application filed June 20, 1921. Serial No 478,863.

My invention is of an apparatus for and process of making stemmed artificial fruit bodies. According to prior practice, artificial fruit bodies have been made without stems and the stems inserted thereafter in a separate operation.

The principal object of the present invention is to provide a process for making the bodies of artificial fruits with the stems in place therein thereby dispensing with the separate operation of inserting the stems, and at the same time securing a more perfect anchorage of the stems in the body than is possible where the stems are inserted in the bodies which have been made separately. A further object of the invention consists in the provision of apparatus for carrying out such process.

In the accompanying drawings Fig. 1 is a front view with parts broken away of apparatus adapted for carrying my process into effect. Fig. 2 is a side view. Fig. 3 is an enlarged vertical sectional view through the center of spindle and die block. Fig. 4 is a plan view of the parts shown in Fig. 3. Fig. 5 is a sectional view taken on line 5—5, Fig. 3. Fig. 6 is an enlarged detail view of cotton feeding and glue regulating mechanism. Fig. 7 is a sectional view taken on line 7—7, Fig. 6. Fig. 8 is an enlarged detail sectional view showing the step of cutting the stem wire and imparting a bend thereto, and Figs. 9 and 10 are detail sectional views showing the spindle guide in closed and open positions respectively.

In carrying out my process with the apparatus shown in the drawings, the wire or other material of the stem is projected through and out beyond the end of a rapidly rotating hollow spindle, and the ball of fibrous material is spun upon the end of the spindle and encloses the projecting end of the wire therein. This wire end is preferably so formed as to be firmly anchored in place in the ball, as by being given a sidewise bend, and after the ball is formed the spindle is withdrawn, and the wire cut off to the proper length to form the stem, the remaining wire to form the stem of the next ball being preferably bent on the end to give it anchorage form at the same time that the wire is cut.

The rapidly rotating spindle 10 is hollow as shown at 11, and a wire 12 for making the stems of the imitation fruit bodies is supplied through the hollow spindle. In the form of apparatus shown, spindle 10 is made replaceable, having its screw threaded base 13 screwed into the hollow shaft 14. Shaft 14 turns in bearings 15, 15 and it is enlarged at the end opposite the spindle 10, as shown at 16, to receive the spool 17 of wire 12. The spool may be supported in various ways. In the form shown, slots 18, 18 are formed in the walls of the wire retainer 16, and a short shaft 20 is inserted within the bore of the spool 17 and is held by its ends between spring clamps 21, 21. Shaft 20 may have a forced fit within the bore of the spool 17, if desired, and in such case the spring clamps 21, 21 frictionally engaging the ends of the spool shaft 20 serve to prevent the wire from unwinding off the spool 17, except as the same is pulled off in the operation of the machine.

The spindle shaft 14 has a pulley 22 thereon and is driven by means of belt 23 from pulley 24 on the drive shaft 25, which is driven from any convenient source of power applied, for example, by the belt wheel 26.

Drive shaft 25, which rotates at high speed, drives the cam shaft 27 through any suitable speed reduction device. As shown, shafts 25 and 27 are at right angles to one another, and the reduction is obtained by means of the worm 28 on shaft 25 driving a worm wheel 29 fixed on shaft 27. Cam shaft 27 carries two cams 30 and 31. Cam 30 actuates the die block and related parts through elbow lever 32 and its spring 32', and cam 31 operates the cotton feeding mechanism and the glue feed mechanism through elbow lever 33, with its spring 33', and link 34.

Die block 35 is slidable relative to the spindle 10 and contains die opening 36 having a section corresponding to the longitudinal cross section of the fruit bodies produced, as cherries, plums, pears and the like, and which may be referred to for convenience as "balls". This die block is mounted to slide in slideways 37 and is actuated by elbow lever 32 which passes through the opening 38 in the die block.

When the parts are in the position of Fig. 1, with spindle 10 projecting into the die opening 36, through guide passage 39, a ball 10' is formed on the rotating spindle 10 and end 12 of the wire 12 projecting from the end of the hollow spindle, the cotton being fed in manner described hereinafter. The end of the wire is firmly imbedded in the cotton ball during its formation and when the slidable die block 35 is moved to the position shown in Fig. 3, carrying the ball 10' with it, the wire 12 is pulled off the spool 17 and through the bore of spindle 10 to form a stem for the artificial fruit body.

Means are provided for cutting off the wire 12 the proper length to form a stem for the fruit body, and in the form shown, the cutter knife 40 for this purpose is mounted on the ejector bar 41 which is provided with a finger 42 for ejecting the finished ball from the die opening in the die block. The ejector bar 41 is pivoted at 43 and is provided with a depending arm 44 which is arranged in the path of the die block 35 and is adapted to be contacted thereby at or near the end of the stroke thereof, thereby depressing the ejector finger 42 and knife 40. A spring 41' serves to normally hold the bar 41 in elevated position, as shown in Fig. 1.

Means are provided for supporting the wire 12 so that it may be cut by knife 40, and in the form shown a vertically slidable cutting block 45 is provided for this purpose immediately beyond the end of the spindle 10 and same is raised simultaneously with the actuation of knife 40 by means of the cam slide 46 actuated from elbow lever 32 by means of the link 47. The cutter block 45 may be depressed by gravity, or a spring may be provided for this purpose, if desired. Cutting block 45 has a beveled upper surface 48 adjacent to its cutting edge 49 so that the knife 40, in addition to cutting off the wire 12, bends the end thereof left projecting from the end of the spindle 10, as shown at 50, Fig. 3, leaving the bent over portion 51 to prevent the wire from retreating within the bore 11 of spindle 10 and to provide a secure anchorage for the next following stem in the succeeding ball of cotton, as will be readily understood from the showing of Fig. 3. The entrance end of guide passage 39 is enlarged on a taper, as shown at 39', in order to insure proper guiding of the spindle and the wire end projecting therefrom.

It is desirable that the die block 35 be open beneath the guide passage 39 for the spindle 10, when the ball and its stem are to be ejected, in order to permit the ready withdrawal of the wire stem. It is also important that the guide passage 39 be complete, without interruption, when the die block is returned from the position of Fig. 3 to that of Fig. 1 to serve as an efficient guide for the spindle and the wire end 12' projecting therefrom, and to this end I have made the part 53 of the die block 35, containing the part 39' of guide way 39, laterally movable with respect to the remaining portion of the die block.

This die block portion 53 is held by spring 54 in the position shown in Fig. 9 when the spindle 10 enters passage 39 in the die block, which serves as a complete guide for spindle 10 and the projecting end 12' of wire 12, but said die block portion 53 can be moved to the position shown in Fig. 5 against the spring 54 so as to free the stem and present a downwardly opening slot or passage 55 through which the stem can be ejected together with the ball to which it is permanently attached. In the construction shown, this action is accomplished by providing the laterally slidable portion 53 with an upstanding pin 56 which is adapted upon reciprocation of the die block 35 to come into contact with the stationary cam 57 (see Fig. 4).

The cotton 58 is preferably provided in the form of a loosely rolled coil in the container 59 and is run over the guide wheel 60 and between the feed rollers or gears 61, 62. The feed rollers are operated intermittently to feed the cotton at the proper time when it is required for making a ball. The spindle 10, which is preferably flattened or square on the outside, engages the roll of cotton or filaments thereof as the same is fed down by the feed rolls, and when the ball is complete and the cotton feed is stopped, the cotton is torn off the roll by the rotating spindle leaving the filaments thereof drawn out and in condition to be engaged by the spindle when the cotton is fed down again for making the next ball, as disclosed and claimed in my Patent No. 1,481,314, granted on January 22nd, 1924.

The cotton feed is arranged so that it may be regulated to supply the correct quantity of material for the making of balls of various shapes and sizes. In the construction illustrated, the driven feed roll 62 has a pinion 63 on its shaft which is actuated by gear 64, and the gear 64, (and therefore the feed rolls 61, 62 driven therefrom) is actuated intermittently by a pawl 65 pivoted to arm 66 and held in engagement with the wheel 64 during the downward movement of the arm by spring 67. Means such as a back pawl may be provided for preventing backward movement of gear 64, if desired, but ordinarily the friction of the various parts is sufficient to prevent any such backward movement from taking place. The arm 66 is pivoted upon the axis of gear 64 and is oscillated by link 34 attached to elbow lever 33. The amount of throw of the arm 66 and therefore, the extent of movement of feed rolls 61, 62 is regulated by the provision of an adjustable pivotal connection between the arm 66 and link 34 as, for example, by the provision of arm 66 with a plurality of pivot holes 68, 68 (see Fig. 2).

The glue for gluing the filaments of the cotton together into a hard compact ball is also fed intermittently and as the glue is to be fed at about the same time that the cotton is fed, the glue feed control is preferably operated from the same arm 66. In the construction shown, faucet 69 of the glue tank 70, which supplies glue, as through the funnel 71 and tube 72, to the die opening 36, is actuated by a link 73 which is pivoted to elbow lever 74 pivoted at 75 to the arm 66, and oscillation of the arm 66 results in the opening and closing of the faucet 69 whereby glue is automatically supplied over the die opening 36.

Means are preferably provided for further regulating and timing the glue feed and, in the form shown, such means are provided by forming the arm 76 of the elbow lever 74 with an arcuate slot 77 into which the pin 78 on the arm 66 projects, as shown in Figs. 6 and 7. Stop means are provided in such slot 77 on each side of the pin 78 and such stops in the form shown consist of stove bolts 79 and 80. By moving either or both of these stove bolts and screwing them up in adjusted position, the amount and location of lost movement between the elbow lever 74 and the arm 66 can be regulated at will and both the timing and amount of glue fed can be adjusted to give best results for the particular work being carried on.

The operation of the apparatus described is as follows: The spool of wire having been inserted in the wire holder and hollow spindle, the coil of cotton having been led to the feed rolls and the glue tank having been supplied with glue, power is turned on. The spindle 10 with the wire 12 projecting therefrom is rotated at high speed and the cotton being fed down encounters the spindle and is spun into a ball of a form defined by the opening in the die block, glue being automatically fed to the ball as it is being spun into shape.

As the opening within the die block is filled, the cotton feed and glue feed are automatically stopped and the cotton filaments are torn from the loosely coiled roll of cotton, leaving the filaments drawn out to engage the spindle when the feed is recommenced. The cotton ball is hard and compact and the stem wire which projects from the end of the hollow spindle during the formation of the ball is firmly secured in place therein. The die block is moved away from the spindle. The ball is thus pulled off the spindle, but the wire remains anchored in the ball and is pulled off the spool by the movement of the die block and ball through the hollow spindle to a length sufficient to make the desired stem. The wire cutting knife descends and the cutter block is raised and the wire is cut off, leaving a stem on the ball and leaving a bent over portion of the wire projecting from the spindle, and the ball with its stem is ejected from the die block by the ejecting finger, the laterally movable portion of the die block having been moved over to permit the downward movement of the stem. The completed product falls into a chute 81 from which it is delivered to a drier, coating apparatus or the like (not shown).

On the return movement of the die block guide passage 39 is made complete by return movement of the die block portion 53 and the spindle 10 with the end of the wire 12′ projecting therefrom is guided into place across the die opening 38, and the operation described is repeated indefinitely and entirely automatically.

It will be seen that my invention completely does away with the time, labor, expense and trouble involved in the insertion of stems as a separate operation, as has been the practice heretofore; and that the stems are anchored in place with a degree of security which cannot be approached by insertion of stems after the body has been formed separately therefrom, thereby securing notable economies both in lessening production cost and in reducing the proportion of product which must be discarded because it will not pass inspection.

It is to be understod that limitations are not to be ascribed to the invention by the specific apparatus shown, but that the invention is of the scope defined by my claims.

I claim:

1. The process of making stemmed artificial fruit bodies which consists in projecting a stem through a rotating spindle, spinning the bodies of fibrous material upon the spindle and stem, and withdrawing the spindle leaving the stem in place.

2. The process of making stemmed artificial fruit bodies which consists in spinning the bodies of fibrous material by rotating a hollow spindle and a stem extending through and beyond the end thereof, and feeding fibrous material to said rotating spindle and stem while defining the shape of the body by means of a die opening.

3. The process of making stemmed artificial fruit bodies which consists in projecting a wire through a hollow spindle, spinning the body of fibrous material about the end of the spindle and the projecting wire, and withdrawing the hollow spindle.

4. The process of making stemmed artificial fruit bodies which consists in projecting the end of a long wire through a hollow spindle and beyond the end thereof, spinning the body of fibrous material about the end of the spindle and the projecting end of the wire, withdrawing the hollow spindle and cutting off the wire.

5. The process of making stemmed artificial fruit bodies, which consists in bending a portion of a wire stem laterally and forming the bodies of fibrous material impregnated with cementitious material with the stem in place therein during the formation.

6. The process of making stemmed artificial fruit bodies, which consists in providing a stem with an anchorage for fibrous material and spinning the bodies of fibrous material with impregnation of cementitious material directly upon the stem leaving the stem in place within the spun body.

7. The process of making stemmed artificial fruit bodies which consists in forming the body in situ on a stem, cutting off the stem, and imparting a lateral bend to the stem material beyond the cut.

8. The process of making stemmed artificial fruit bodies which consists in forming the body in situ on a laterally bent wire, cutting off the wire to form a stem for the body, and simultaneously making a lateral bend in the remaining portion of the wire.

9. The process of making stemmed balls of fibrous material which consists in spinning fibrous material on a stem while applying cementitious material thereto and automatically shutting off the supply of cementitious material when the ball is completed.

10. The process of making balls of fibrous material, which consists in spinning fibrous material on the end of a wire long enough to make stems for a plurality of balls, and drawing the wire along by pull applied to the ball.

11. The process of making stemmed balls of fibrous material, which consists in spinning fibrous material upon a wire projecting from a rotating hollow spindle, and pulling the wire out of the spindle by pull applied to the ball.

12. The process of making stemmed balls of fibrous material, which consists in spinning fibrous material upon a wire projecting from a rotating hollow spindle, pulling the wire out of the spindle by pull applied to the ball, and cutting off the wire beyond the end of the spindle.

13. Apparatus for making stemmed artificial fruit bodies comprising a hollow rotating spindle and a wire holder holding wire so that it extends out of the end of the spindle, said wire holder rotating with the spindle.

14. Apparatus for making stemmed artificial fruit bodies comprising a hollow shaft, and means within the hollow shaft for holding a supply of wire.

15. Apparatus for making stemmed artificial fruit bodies comprising a hollow shaft having an enlarged opening in a portion thereof, and a spool holder within such enlarged opening.

16. Apparatus for making stemmed artificial fruit bodies comprising a hollow shaft, a hollow spindle carried thereby, and a wire holder rotating with the shaft, the wire being adapted to extend out of the end of the hollow spindle.

17. Apparatus for making stemmed artificial fruit bodies comprising a hollow shaft, a holder for a spool of wire rotating with the shaft and adapted to hold the spool with its axis transverse to the shaft axis.

18. Apparatus for making stemmed artificial fruit bodies comprising a hollow shaft, a holder for a spool of wire rotating with the shaft with the axis of the spool transverse to the shaft axis and with the wire extending out through the end of the hollow shaft, and friction means for somewhat retarding the unwinding of wire from the spool.

19. Apparatus for making stemmed artificial fruit bodies comprising a hollow shaft, a wire holder formed as a part of the shaft and rotating therewith, a hollow spindle replaceably secured to an end of the shaft, the wire being adapted to extend into the hollow spindle, and out of the outer end thereof.

20. Apparatus for making stemmed artificial fruit bodies comprising a hollow shaft with an enlarged recess therein in the neighborhood of one end thereof, a spool holder for holding a spool of wire in said recess and with its axis substantially transverse to the shaft axis, means for somewhat retarding the unwinding of wire from the spool, a hollow spindle screw fastened to the other end of the shaft and the wire being adapted to extend out of the outer end of the spindle, and means for feeding fibrous material to the spindle and the projecting end of the wire.

21. Apparatus for making stemmed artificial fruit bodies comprising a rotatable spindle and stem, means for intermittently feeding cotton to the spindle and stem projecting therefrom, and means for feeding cementitious material actuated from the cotton feeding means.

22. Apparatus for making stemmed artificial fruit bodies comprising a rotatable spindle, means for intermittently feeding fibrous material to the spindle, and means actuated from said feeding means for feeding cementitious material, said last named means being adjustable with respect to the first named means.

23. In apparatus for making artificial fruit bodies, a rotating spindle, fibrous material feeding means, cementitious material feeding means, and common actuating means for the two feeding means.

24. In apparatus for making stemmed balls of fibrous material, means for forming the balls in a die opening with a wire imbedded therein, means for ejecting the completed balls from the die, and means for cutting off the wire to form a stem.

25. In apparatus for making stemmed balls of fibrous material, a die block having a die opening and a guide passage extending into the die opening and a member adjacent to said guide passage and having a part thereof formed therein, said member being movable with respect to said die block to provide an open slot in communication with said guide passage adapted to permit a stem for a spun ball to be laterally removed from said passage.

26. In apparatus for making stemmed balls of fibrous material, a spindle, a die block made in parts relatively movable to one another, and a guide passage for the spindle being formed partially in each of said parts.

27. In apparatus for making stemmed balls of fibrous material, a spindle, a die block movable relatively thereto and having a die opening therein and having a guide passage for said spindle communicating with the die opening in the block, and movable means adjacent to and forming part of the walls of said guide passage for temporarily providing a lateral outlet from said passage whereby the stem of a ball in said die block may be laterally removed from said passage.

28. In apparatus for making stemmed artificial fruit bodies, a die having a guide passage therein adapted to be opened up intermittently, and means for discharging the stem laterally from said guide passage when so opened.

29. In apparatus for making stemmed balls of fibrous material, wire supplying means, and means for imparting a lateral bend to one end of the wire.

30. In apparatus for making stemmed balls of fibrous material, wire supplying means, and means for cutting off the wire to stem length and simultaneously forming a lateral bend in the end of the remaining wire.

31. In apparatus for making stemmed balls of fibrous material, a hollow spindle, means for supplying wire to extend out of said spindle, a knife for cutting off the wire, and a cutting block having a portion to coact with the knife in cutting the wire, and a portion to impart a lateral bend to the remaining end of the wire as it is depressed by the knife.

32. In combination, means for supporting a wire, means for rotating the support, a mold to receive the end of the wire, means for shifting the wire longitudinally, and means for severing the wire.

In testimony that I claim the foregoing, I have signed my name hereto.

CARLO DE FELICE.